United States Patent
Linnen et al.

(10) Patent No.: US 12,292,796 B2
(45) Date of Patent: May 6, 2025

(54) DATA STORAGE DEVICE AND METHOD FOR PERFORMANCE-DEPENDENT STORAGE OF PARITY INFORMATION

(71) Applicant: Western Digital Technologies, Inc., San Jose, CA (US)

(72) Inventors: Daniel J. Linnen, Naperville, IL (US); Ramanathan Muthiah, Bangalore (IN); Noor Mohamed Aa, Kumbakonam (IN)

(73) Assignee: Sandisk Technologies, Inc., Milpitas, CA (US)

( * ) Notice: Subject to any disclaimer, the term of this patent is extended or adjusted under 35 U.S.C. 154(b) by 152 days.

(21) Appl. No.: 18/225,803

(22) Filed: Jul. 25, 2023

(65) Prior Publication Data

US 2024/0362116 A1 Oct. 31, 2024

Related U.S. Application Data

(60) Provisional application No. 63/462,787, filed on Apr. 28, 2023.

(51) Int. Cl.
| | |
|---|---|
| *G06F 11/00* | (2006.01) |
| *G06F 11/10* | (2006.01) |
| *G06F 12/02* | (2006.01) |

(52) U.S. Cl.
CPC ........ *G06F 11/108* (2013.01); *G06F 11/1096* (2013.01); *G06F 12/02* (2013.01)

(58) Field of Classification Search
CPC . G06F 11/108; G06F 11/1096; G06F 11/1076

USPC .......................................... 714/1–57
See application file for complete search history.

(56) References Cited

U.S. PATENT DOCUMENTS

| | | | |
|---|---|---|---|
| 11,704,211 | B1 * | 7/2023 | Kaplan ............... G06F 11/1666 714/6.13 |
| 2011/0088008 | A1 * | 4/2011 | Fifield .................. G06F 30/327 714/763 |
| 2014/0359346 | A1 * | 12/2014 | Chen .................. G06F 11/1072 714/6.11 |
| 2015/0058700 | A1 * | 2/2015 | Yang .................. G06F 11/1012 714/773 |
| 2016/0077749 | A1 * | 3/2016 | Ravimohan ............. G06F 3/064 711/103 |
| 2017/0076811 | A1 * | 3/2017 | Reusswig ............ G11C 16/349 |
| 2019/0317672 | A1 * | 10/2019 | Linnen .................. G06F 3/0659 |
| 2020/0117539 | A1 * | 4/2020 | Sun ..................... H03M 13/1105 |
| 2022/0108745 | A1 * | 4/2022 | Gorobets ............... G11C 16/26 |
| 2022/0121391 | A1 * | 4/2022 | Siripragada ............. G06F 3/064 |

(Continued)

*Primary Examiner* — Sarai E Butler

(74) *Attorney, Agent, or Firm* — Crowell & Moring LLP

(57) ABSTRACT

A data storage device can store data and parity information for the data in its memory. In some storage methodologies, data and parity information are striped across a plurality of memory dies (e.g., in a redundant array of independent drives (RAID) configuration). That way, if one of the memory dies fails, the data or the parity information can be reconstructed from the other memory dies. These embodiments recognize that because parity information is used relatively infrequently, the parity information can be stored in locations in the memory that have a relatively-worse performance than other areas of the memory. This can increase performance of the memory in situations where the parity information does not need to be read.

20 Claims, 20 Drawing Sheets

(56) References Cited

U.S. PATENT DOCUMENTS

| | | | |
|---|---|---|---|
| 2023/0214299 A1* | 7/2023 | Venkataraman | G06F 11/1012 714/6.24 |
| 2023/0393920 A1* | 12/2023 | Kwong | G06F 11/073 |
| 2023/0393938 A1* | 12/2023 | Rayaprolu | G06F 11/076 |

* cited by examiner

| Logical Parity Layout | | | | |
|---|---|---|---|---|
| | Die0 | Die1 | Die2 | Die3 |
| Stripe0 | a0 | a1 | a2 | |
| Stripe1 | | b0 | b1 | b2 |
| Stripe2 | c0 | | c1 | c2 |
| Stripe3 | d0 | d1 | | d2 |
| Stripe4 | e0 | e1 | e2 | |
| Stripe5 | | f0 | f1 | f2 |
| Stripe6 | g0 | | g1 | g2 |
| Stripe7 | h0 | h1 | | h2 |

| Physical Parity Layout | | | | |
|---|---|---|---|---|
| | Die0 | Die1 | Die2 | Die3 |
| WL0 | a0 | a1 | a2 | |
| WL1 | | b0 | b1 | b2 |
| WL2 | c0 | | c1 | c2 |
| WL3 | d0 | d1 | | d2 |
| WL4 | e0 | e1 | e2 | |
| WL5 | | f0 | f1 | f2 |
| WL6 | g0 | | g1 | g2 |
| WL7 | h0 | h1 | | h2 |

FIG. 12

Logical Parity Layout

|  | Die0 | Die1 | Die2 | Die3 |
|---|---|---|---|---|
| Stripe0 | a0 | a1 | a2 | ▨ |
| Stripe1 | ▨ | b0 | b1 | b2 |
| Stripe2 | c0 | ▨ | c1 | c2 |
| Stripe3 | d0 | d1 | ▨ | d2 |
| Stripe4 | e0 | e1 | e2 | ▨ |
| Stripe5 | ▨ | f0 | f1 | f2 |
| Stripe6 | g0 | ▨ | g1 | g2 |
| Stripe7 | h0 | h1 | ▨ | h2 |

Physical Parity Layout

|  | Die0 | Die1 | Die2 | Die3 |
|---|---|---|---|---|
| WL0 | a0 | a1 | a2 | c2 |
| WL1 | c0 | b0 | b1 | b2 |
| WL2 | d0 | d1 | ▨ | d2 |
| WL3 | ▨ | ▨ | c1 | ▨ |
| WL4 | e0 | ▨ | ▨ | ▨ |
| WL5 | g0 | f0 | f1 | f2 |
| WL6 | g0 | e1 | g1 | g2 |
| WL7 | h0 | h1 | e2 | h2 |

FIG. 13

DATA STORAGE DEVICE AND METHOD FOR PERFORMANCE-DEPENDENT STORAGE OF PARITY INFORMATION

CROSS-REFERENCE TO RELATED APPLICATION

This application claims priority to U.S. provisional patent application No. 63/462,787, filed Apr. 28, 2023, which is hereby incorporated by reference.

BACKGROUND

A data storage device can store data and parity information for the data in its memory. In some storage methodologies, data and parity information are striped across a plurality of memory dies (e.g., in a redundant array of independent drives (RAID) configuration). That way, if one of the memory dies fails, the data or the parity information can be reconstructed from the other memory dies.

BRIEF DESCRIPTION OF THE DRAWINGS

FIG. 12 is a diagram illustrating logical and physical parity layouts of an embodiment.

FIG. 13 is a diagram illustrating logical and physical parity layouts of an embodiment.

DETAILED DESCRIPTION

The following embodiments generally relate to a data storage device and method for performance-dependent storage of parity information. In one embodiment, a data storage device is provided comprising a plurality of memory dies and a controller. The controller is configured to: store data and parity information for the data in locations in the plurality of memory dies; determine that at least one location in the plurality of memory dies has a lower performance than the locations storing the parity information; and move the parity information to the at least one location in the plurality of memory dies that has the lower performance.

In another embodiment, a method is provided that is performed in a data storage device comprising a memory. The method comprises: reading data from a location in the memory; determining that the location has a performance below a threshold; designating the location for future storage of parity information; and storing parity information in the location.

In yet another embodiment, a data storage device is provided comprising: a plurality of memory dies; means for storing data and parity information for the data in locations in the plurality of memory dies; means for determining that at least one location in the plurality of memory dies has a lower performance than the locations storing the parity information; and means for moving the parity information to the at least one location.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1A:
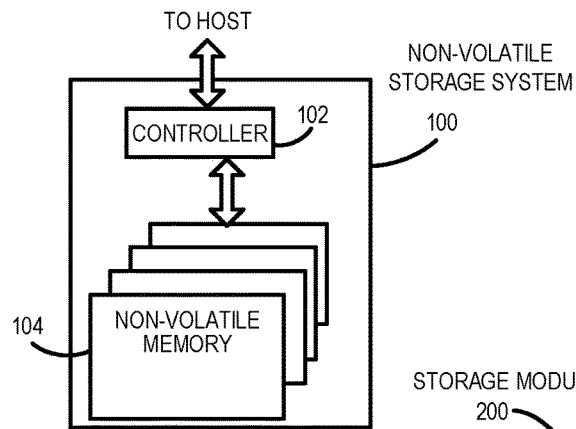
FIG. 1A is a block diagram of a data storage device of an embodiment.
Figure 1B:
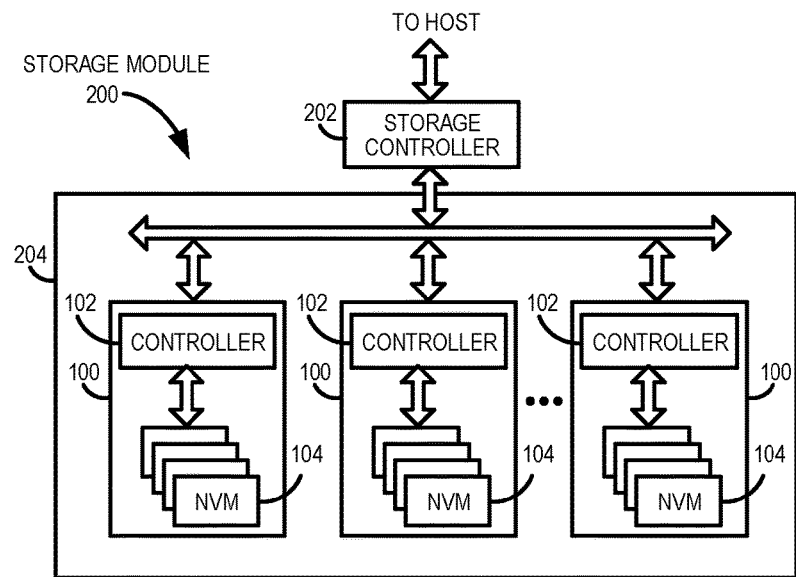
FIG. 1B is a block diagram illustrating a storage module of an embodiment.
Figure 1C:
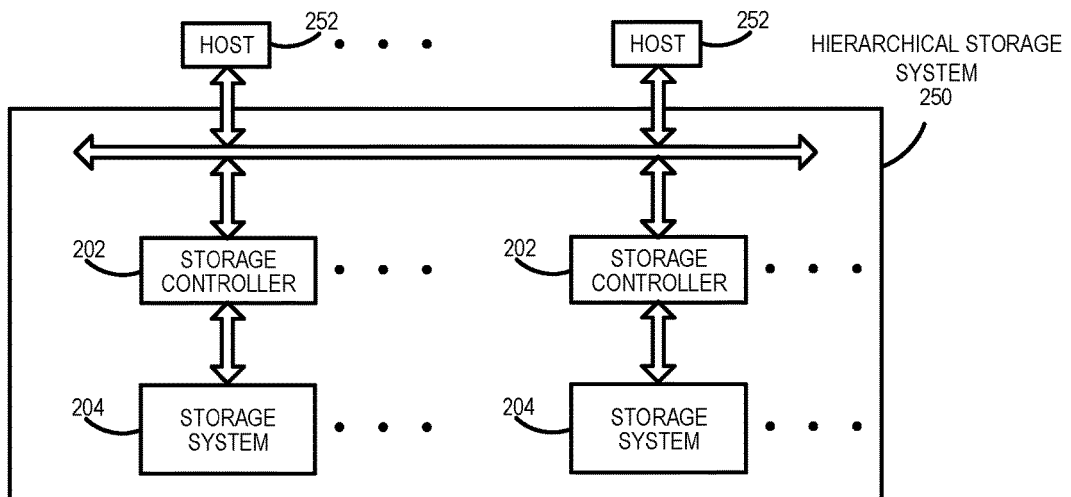
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-times programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
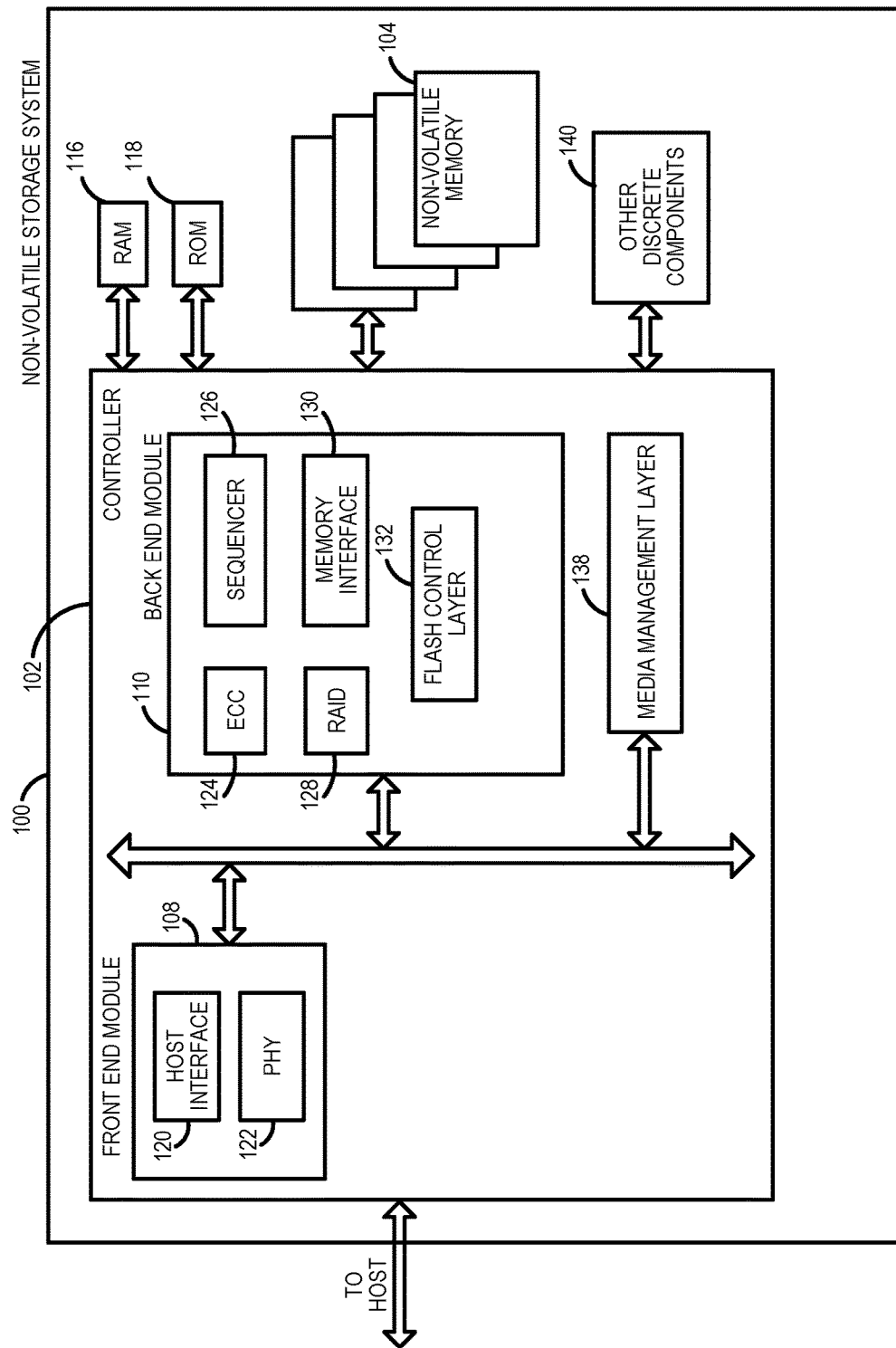
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
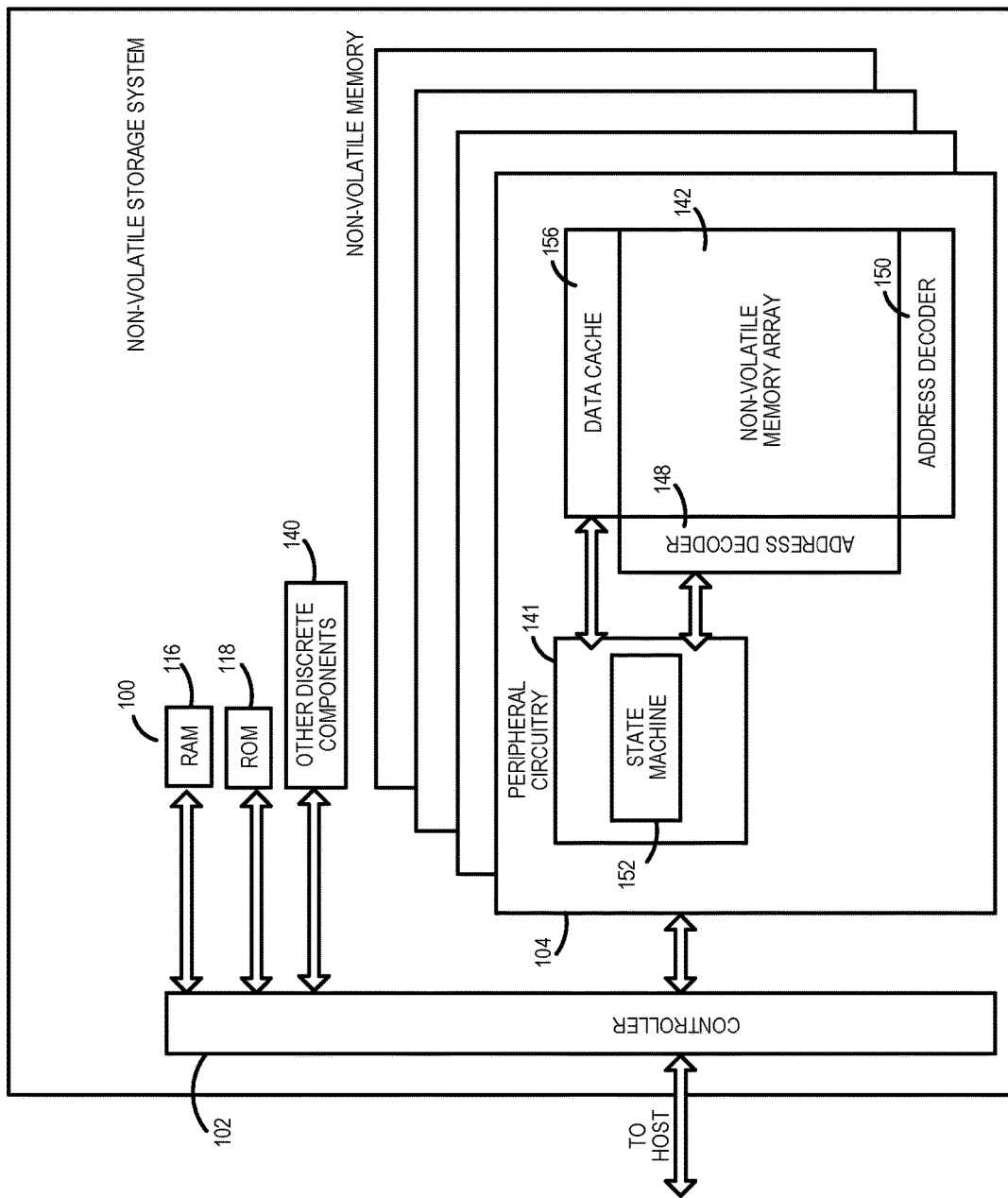
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
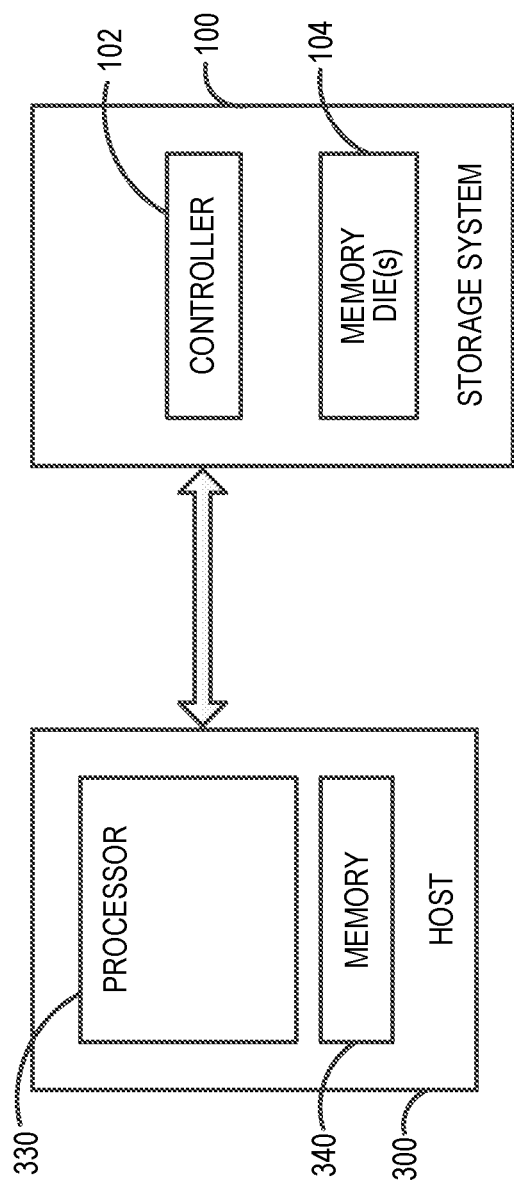
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As discussed above, a data storage device can store data and parity information for the data in its memory. For example, an exclusive-or (XOR) operation can be used to create parity information for pages of data. An XOR operation refers to the logical operation that outputs a logical 1 (or 0) only when the inputs differ (i.e., one input is logical 1, and the other input is logical 0). The result of an XOR operation (sometimes referred to herein as XOR parity) can be used to recover data. In one embodiment, an XOR operation is performed as pages of data are written to memory, and the resulting XOR parity is stored. If the pages are of the same size, the XOR parity will have the same size as one of the pages. Accordingly, the XOR parity page is the cumulative XOR of all pages in a set of pages (e.g., a block or a plurality of blocks). Since XOR is an "in-place" operation, the size of the parity page does not increase as the number of pages being written increases.

XOR parity can be useful in situations where other data protection schemes (e.g., error correction code (ECC)) cannot recover data that has errors in it (e.g., due to defective memory cells). For example, due to the limited size of ECC parity bits, in some data storage devices, ECC protection can only correct error rates of about 1.5%. If the ECC is not able to correct the error, XOR parity can be used to recover the entire page (in other situations, XOR parity can be used instead of ECC, so XOR parity could be the primary data protection scheme). So, if a later attempt to read or write to one of the pages of data fails due to an uncorrectable error, the page of data can be recovered by performing a "de-XORing" operation on the XOR parity. This is due to the XOR property that if "A XOR B=C", then "A=C XOR B" and "B=C XOR A". So, in this example, if C is the XOR parity, and A is the page that needs to be recovered, the data storage device can read page B from the memory and XOR it with the XOR parity (C).

In some storage methodologies, data and parity information are striped across a plurality of memory dies (e.g., in a redundant array of independent drives (RAID) configuration). That way, if one of the memory dies fails, the data or the parity information can be reconstructed from the other memory dies. For example, many solid-state drives (SSDs) have data stored with parity in the memory in a RAID4, RAID5, or RAID6 configuration, meaning that data from uncorrectable (corrupted) locations can be reconstructed by combining the various parts of data in a stripe via XOR (RAID4/RAID5) or Reed-Solomon (RAID6) correction methods.

Aside from the reconstruction process, these parity locations are not used and, as a result, are rarely read. Further, performance in a data storage device can be limited based on a single die because the data is striped and is often accessed (read) in chunks. In other words, a single slow die can impact the performance of the data storage device. In enterprise workloads, accesses may be smaller, but the quality of service impact of a slow die can still be problematic for performance in that environment.

These embodiments recognize that because parity information is used relatively infrequently, the parity information can be stored in locations in the memory that have a relatively-worse performance than other areas of the memory. This can increase performance of the memory in situations where the parity information does not need to be read. That is, these embodiments take advantage of the lack of use on the parity location to improve the performance of slow die(s) by migrating more parity locations to the slow die(s). In this way, these embodiments can make up for the poor performance of a memory die by migrating parity data to that memory die, so that it sees fewer operations and has less impact to the overall performance of the data storage device.

In general, with these embodiments, the controller 102 can store data and parity information for the data in locations in a plurality of memory dies of the memory 104. This can be done using conventional storage (e.g., RAID) methodologies. Over time, the controller 102 can determine that at least one location in the plurality of memory dies has a lower performance than the locations storing the parity information. Performance can be measured in any suitable way, including, but not limited to, by a number of read retries needed to read data, by a bit error rate, and/or by a number of programming pulses or programming time needed to program data.

Then, the controller 102 can move the parity information to the at least one location in the plurality of memory dies that has the lower performance. As mentioned above, this can lead to an increase in the overall performance of the data storage device 100 because data can be read without the need to read the parity information for reconstruction. There are several advantages associated with moving parity information to a location that alleviates performance issues. For example, as future memory designs become more complicated (e.g., with a higher numbers of bits per cells and higher wordline stack counts), errors will become more likely, and mitigation options to deal with such errors can come at the cost of read performance, with the overall performance of the data storage device being limited by the worst performing die/dice. In contrast, using these embodiments can increase performance and does not require hardware changes (the changes can be made in software/firmware in the controller 102) and does not minimize coverage against defects in any way.

The following paragraphs provide several examples of performance-dependent storage of parity information. Some of these examples are described in terms of RAID architectures (e.g., RAID4 targets a single die with parity, while RAID5 and RAID6 spread the parity around evenly). With these embodiments, parity information can spread parity around unevenly so as to target a slower memory die with parity data, thus reducing the demand on those dice. It should be understood that these are merely examples and that the details presented herein should not be read into the claims unless expressly recited therein.

Figure 4:
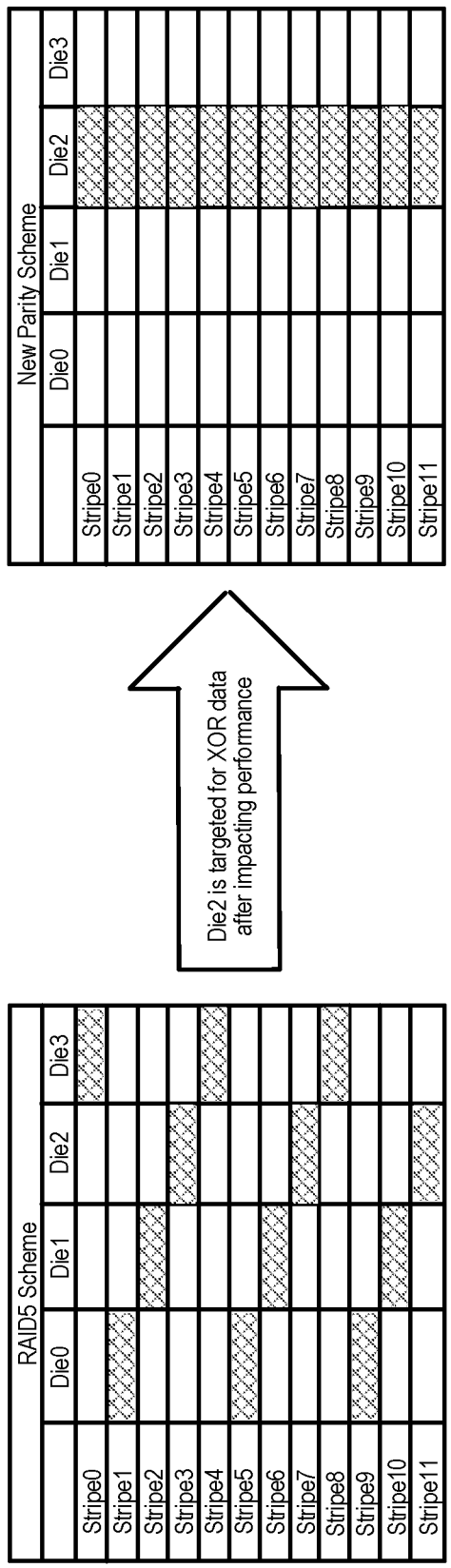
FIG. 4 is a diagram illustrating a method of an embodiment for performance-dependent storage of parity information in which parity information is moved from a RAID5 configuration to a single memory die.

Turning again to the drawings, FIG. 4 is a diagram illustrating a method of an embodiment for performance-dependent storage of parity information in which parity information is moved from a RAID5 configuration to a single memory die. In this example, Die 2 is targeted for (XOR) parity data after impacting performance. As shown in FIG. 4, the parity information is initially stored across all of the plurality of memory dies and moved to Die 2, which was found to have a lower performance than the other dies.

Figure 5:
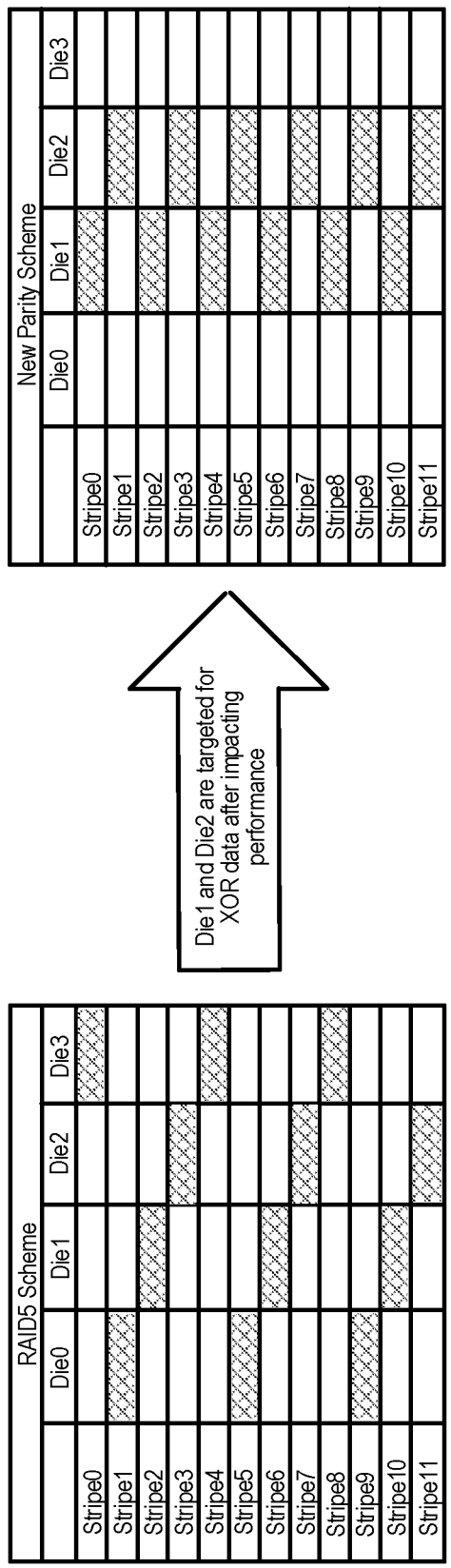
FIG. 5 is a diagram illustrating a method of an embodiment for performance-dependent storage of parity information in which parity information is moved from a RAID5 configuration to two memory dies.

FIG. 5 is a diagram illustrating a method of an embodiment for performance-dependent storage of parity information in which parity information is moved from a RAID5 configuration to two memory dies. Here, Die 1 and Die 2 are targeted for parity information after determining that those two dies have a worse performance that the other dies.

Figure 6:
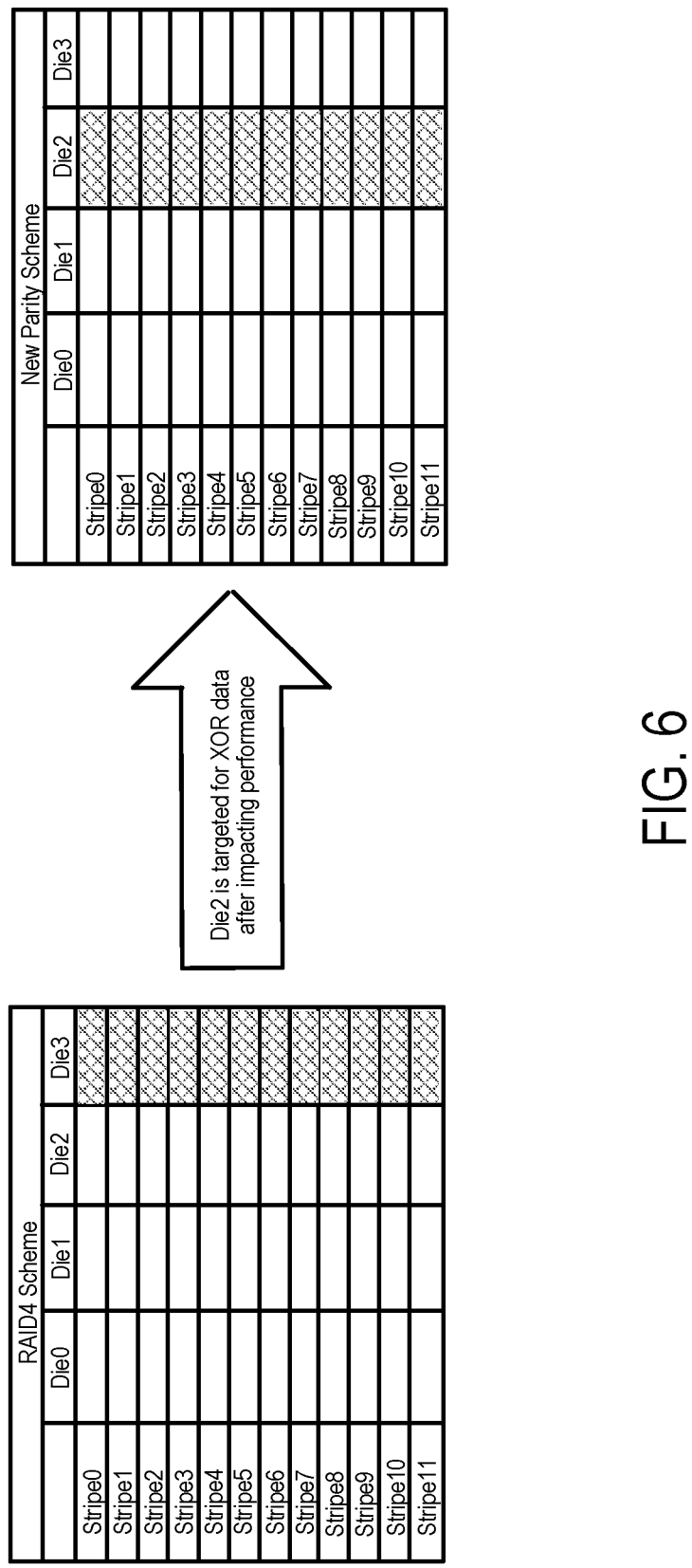
FIG. 6 is a diagram illustrating a method of an embodiment for performance-dependent storage of parity information in which parity information is moved from a RAID4 configuration to a single memory die.

FIG. 6 is a diagram illustrating a method of an embodiment for performance-dependent storage of parity information in which parity information is moved from a RAID4 configuration to a single memory die. Here, Die 2 is targeted for storage of parity information. As shown in FIG. 6, all of the parity information is initially stored in a single memory die (Die 3) and moved to different memory die (Die 3).

Figure 7:
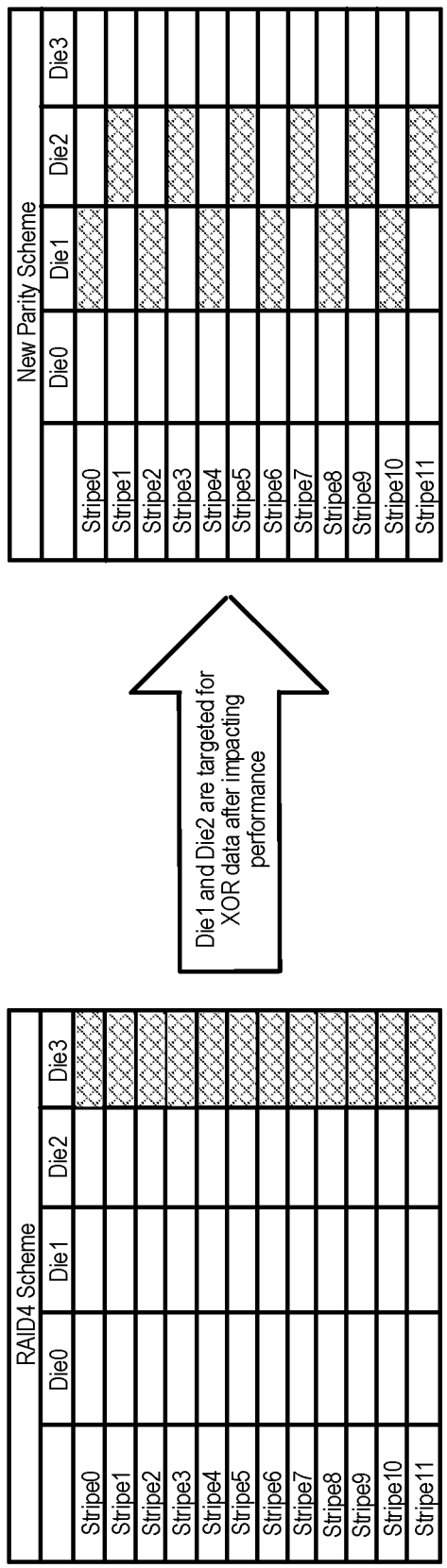
FIG. 7 is a diagram illustrating a method of an embodiment for performance-dependent storage of parity information in which parity information is moved from a RAID4 configuration to two memory dies.
Figure 8:
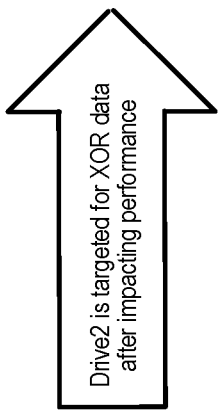
FIG. 8 is a diagram illustrating a method of an embodiment for performance-dependent storage of parity information in which parity information is moved from a RAID5 configuration to a single drive.
Figure 9:
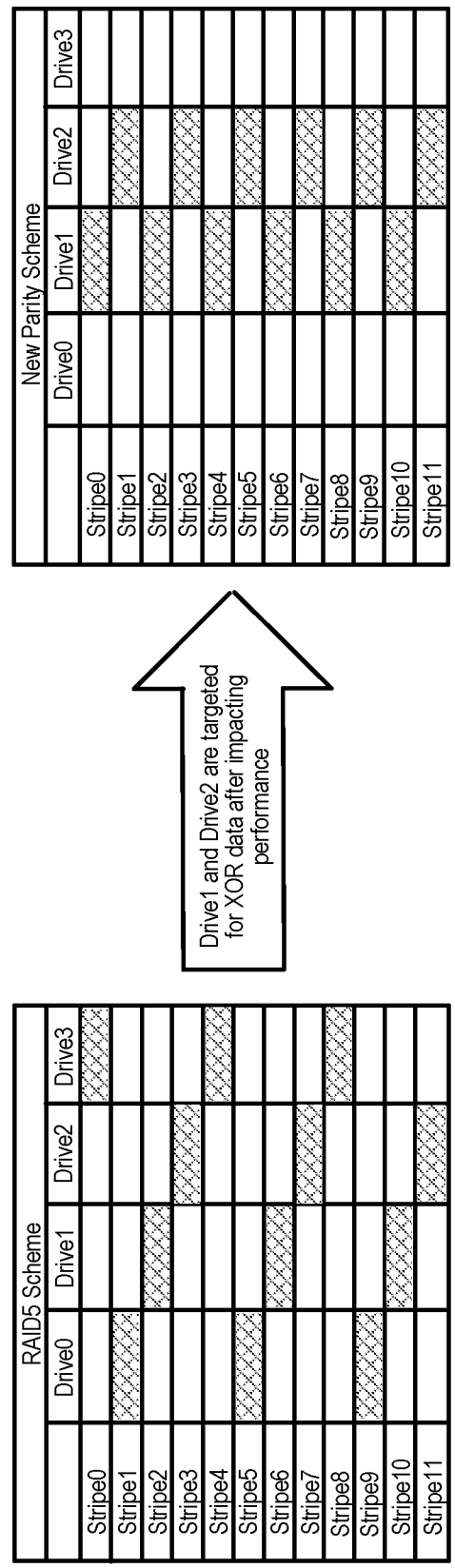
FIG. 9 is a diagram illustrating a method of an embodiment for performance-dependent storage of parity information in which parity information is moved from a RAID5 configuration to two drives.
Figure 10:
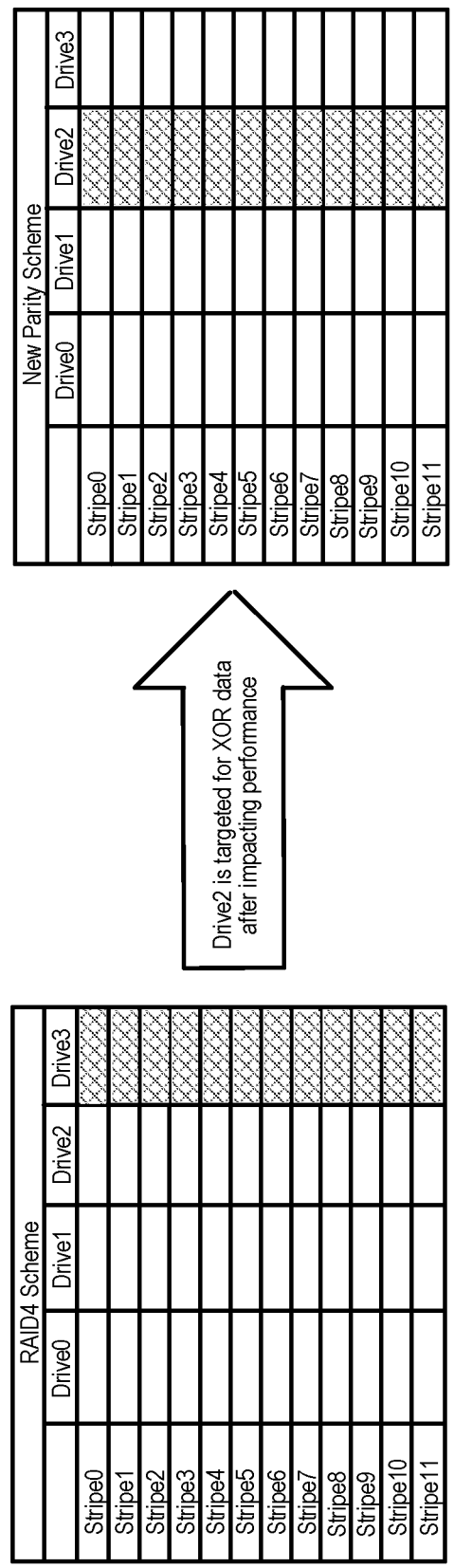
FIG. 10 is a diagram illustrating a method of an embodiment for performance-dependent storage of parity information in which parity information is moved from a RAID4 configuration to a single drive.
Figure 11:
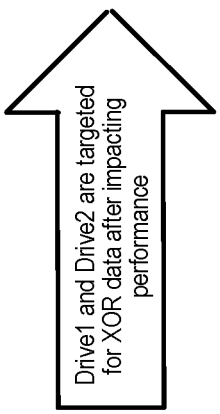
FIG. 11 is a diagram illustrating a method of an embodiment for performance-dependent storage of parity information in which parity information is moved from a RAID4 configuration to two drives.

FIG. 7 is a diagram illustrating a method of an embodiment for performance-dependent storage of parity information in which parity information is moved from a RAID4 configuration to two memory dies. In this example, Die 1 and Die 2 are targeted for storage of parity information.

Any suitable algorithm can be used to determine what die in a stripe to apply the parity information. One such algorithm uses an array with probabilities weighted toward the die/dies that are the most problematic for performance and a random number to be the index into the array. An example initialization can be: ArrayForParityLocation=[1,1,1,1,2,2, 2,2], and an example code for use can be: DieForParityLocation=ArrayForParityLocation [int (rand( )*8)]. Rand( ) would return a random fraction number with equal probability of being any number between 0 and 1. (If the random number was larger, it can just be scaled down by division.) The array is populated based on the likelihood that a die is a problem, which can be calculated by the fraction of read retries that are attributed to the die. If all dice are evenly impacted (or unimpacted) by read retries, the array could be ArrayForParityLocation=[0,0,1,1,2,2,3,3]. If 75% of the read retries are due to Die1 and 25% on Die2, then ArrayForParityLocation=[1,1,1,1,1,1,2,2]. If 100% of the read retries are due to Die2, then ArrayForParityLocation= [2,2,2,2,2,2,2,2]. It should be understood that this is merely an example and that other implementations can be used (e.g., with larger arrays).

In the above examples, parity information was moved from one or more dies to different die(s). In another example, parity information is moved from one or more drives to different drive(s). This is shown in FIGS. 8-11, which are similar to FIGS. 4-7. There are several advantages with these embodiments. For example, these embodiments can reduce the need for technicians to go into datacenters to pull slow drives. These embodiments can also enable the use of cheaper, slower drives. To do this, the array can be built with a slower drive, such as a quad-level cell (QLC) drive in place of a triple-level cell (TLC) drive or an shingled magnetic recording (SMR) drive in place of a conventional magnetic recording (CMR) drive. This can result in an intelligent remapping of the RAID array's parity to this lower-cost drive and can be done when the array is first built, when a drive fails and needs to be replaced, when upgrading coverage from a RAID5 scheme to a RAID6 scheme, etc. Essentially this can be done at any point where it makes sense to be adding a drive to the array. This can also be done if someone wanted to pull a high-performance drive for use in a different array, as they can pull that drive out and add another drive of a lower performance. Also, if the RAID is software-defined or managed by a tool, the array can be notified via an application program interface (API) that the drive being added is a lower-performance drive, so that it would not have to learn that it is lower performance and adjust accordingly.

In another example, instead of moving parity information from one or more dies to different die(s), parity information can be stored across a plurality of wordlines of the plurality of memory dies and moved to at least one wordline (e.g., two wordlines) of the plurality of memory dies that has the lower performance (e.g., during a folding operation). This is sometimes referred to herein as "horizontal parity placement." This example will now be discussed in conjunction with FIGS. 12 and 13. FIG. 12 shows logical and physical parity layouts, where the parity information is spread across various wordlines in the plurality of dies. In contrast, in FIG. 14, the parity information is stored in two lower-performance wordlines that run across the plurality of dies.

This embodiment recognizes that not all wordlines are equally good and that some wordlines have a higher probability of failure or a higher probability of requiring additional reads. So, when read failures happen on user data, either read failures that can be recovered by XOR or read failures that require additional reads of the location, there is a performance impact to the host. By placing the parity information on wordlines that are most likely to fail or require read retries to recover the data, the impact to the host performance is minimized on wordlines that are more marginal. This is in contrast to current parity placements that are done without consideration of the underlying reliability of the locations. Again, by placing the parity in locations that will optimize host performance by minimizing read-retry attempts or minimize the likelihood of needing an XOR recovery, these embodiments can keep host data away from marginal wordlines as much as possible, while maintaining horizontal parity protection. Another advantage of these embodiments is that there can be full die protection and full block protection, maintaining horizontal parity protection, but optimizing it through vertical reordering.

Also, as noted above, the parity information movement can be done during a folding (or garbage collection) operation, as this layout is optimized to allow for single-level cell (SLC) to triple-level cell (TLC)/quad-level cell (QLC) folding without clocking the data out on the bus. However, folding is not required to utilize this methodology, although that may require more XOR contexts if these parity schemes are not performed during folding or garbage collection.

Figure 14:
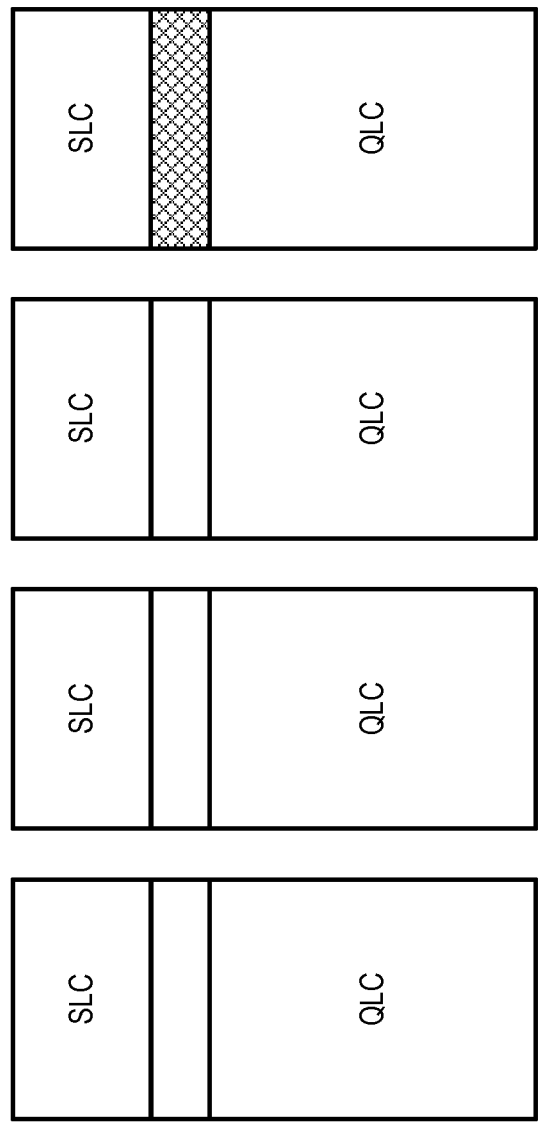
FIG. 14 is a diagram illustrating parity information placement in single-level cell blocks and multi-level cell blocks.
Figure 15:
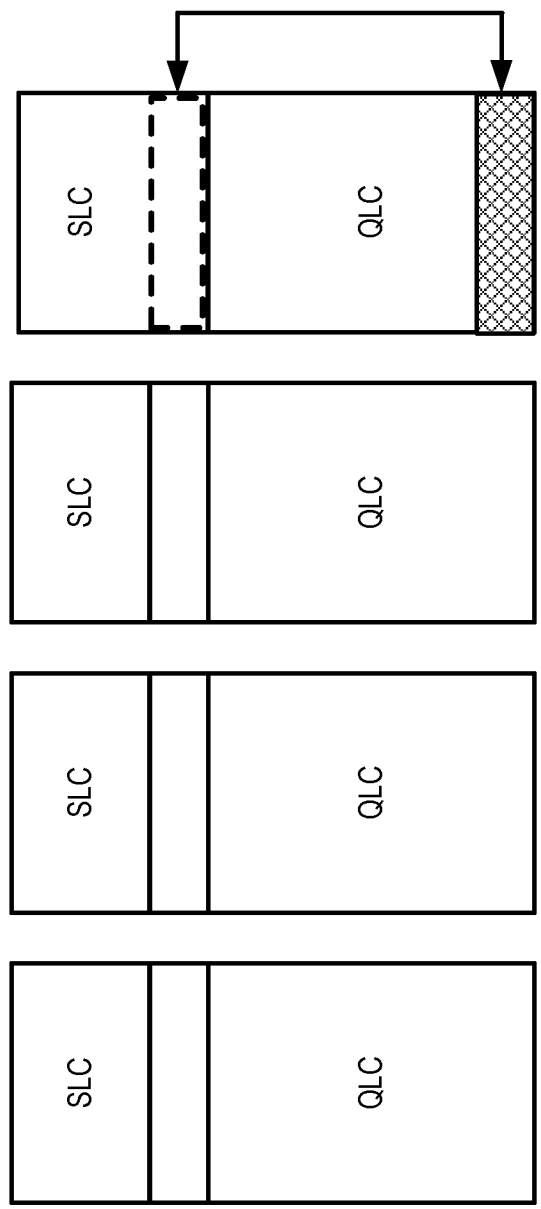
FIG. 15 is a diagram illustrating parity information placement in single-level cell blocks and multi-level cell blocks.

Another example relates to parity information placement in single-level cell blocks and multi-level cell blocks and will be illustrated in conjunction with FIGS. 14 and 15, where FIG. 15 shows a swap of a target parity location, so faster SLC memory can be used for user data. The embodiments recognize that not all locations in a memory are created equally. Further, under host-managed storage (i.e. open channel), some locations will have higher performance than others (e.g., SLC vs. TLC or QLC). RAID arrays store parity in higher performance SLC locations and lower performance TLC/QLC equally, but since parity is rarely utilized in reads and since parity writes can be typically non-gating, this is suboptimal. With these embodiments, a RAID array can choose to store parity in slower TLC or QLC locations, which have a slower data rate associated with them, so that user data can be stored in place of that in the faster SLC locations. Thus, the performance of the RAID array will be increased.

Depending on how the write of the SLC or TLC/QLC would be done, this might be of no effort to the RAID array. For example, it may involve flagging the level of bits per cell or performance associated with a piece of data and setting it to lower performance/reliability in the case of parity, leaving the SSD to store the data in an appropriate place. Additionally, even if the RAID controller had to keep track of the swaps, they would be algorithmic, as would the placement of the parity, so it would not require special memory to do this. Also, parity would not need to be as drastic as SLC to QLC, but rather it could be stored as SLC to MLC or TLC to QLC, to better keep up with the host data in the stripe. Also, by pointing the parity to higher bits per cells, without doing any swapping, it would increase the spare area on every SSD, thus increasing the spare area across the entire array, reducing write amplification and increasing performance.

Open channel SSD is host-managed storage. Hence, to accomplish the swap, the controller 102 can fake the host 300 on the parity storage location by internally handling the double mapping. Further, the controller 102 does not need to change the host-side perspective for the data or the parity but instead can internally swap them as per proposed logic and manages the mapping to the swap as an internal operation. The controller 102 can use the double mapping when there is a need to use the parity data, which is usually during flash errors.

In yet another embodiment, reliability of a memory location based on a previous cycle is factored into XOR stripe placement. When data is determined during a read (host or background) to have a high enough bit error rate that it should be refreshed (i.e. written elsewhere), there are typically two possible causes: either a bad location (extrinsic) or that the data suffered from an intrinsic mechanism. In some cases, it may not be known if a data location is experienced an intrinsic or extrinsic behavior that drove an elevated bit error rate, but the location may not be bad enough to trigger retirement, increasing the possibility of a failure at that region. To decrease the likelihood of failure occurring on host data in these marginal locations, these embodiments can be used to restructure the XOR stripe such that the XOR data is placed in the location that was closest to failing in a previous cycle. This will now be discussed in conjunction with FIGS. 16 and 17.

Figure 16:
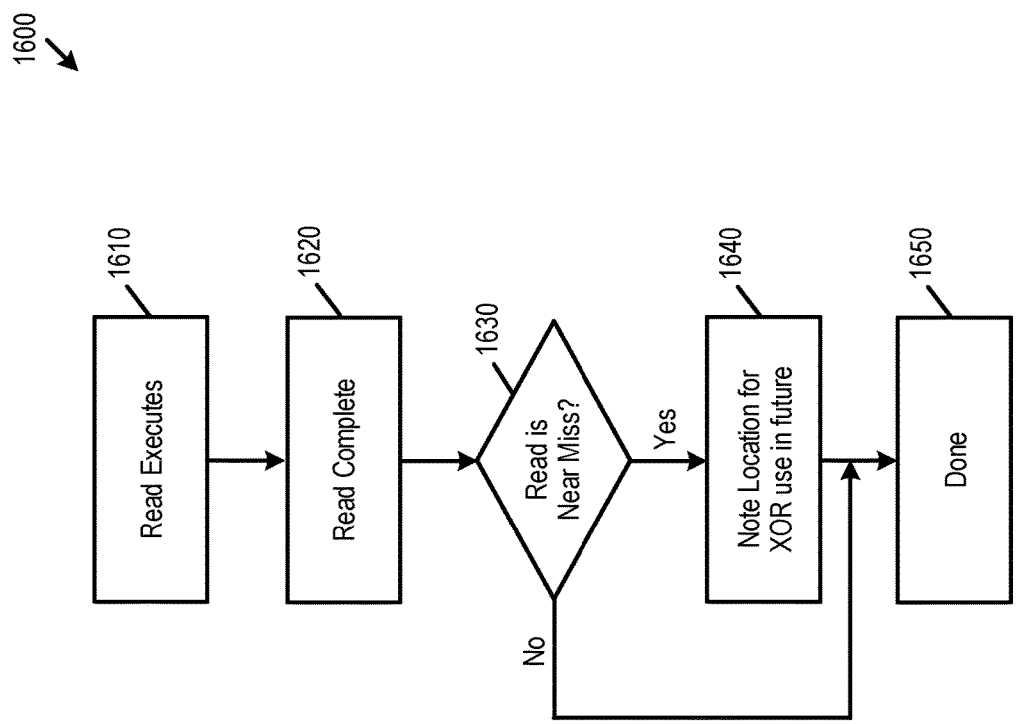
FIG. 16 is a flow chart of a read operation of an embodiment.

FIG. 16 is a flow chart 1600 of a read operation of an embodiment. As shown in FIG. 16, after the controller 102 executes and completes a read operation to a location in the memory 104 (acts 1610, 1620), the controller 102 determines whether the location has a performance problem (act 1630). A performance problem can be determined in any suitable way, such as, but not limited to, determining whether the read was a near miss (e.g., using bit error rate (BER), distance moved in the digital-to-analog converting (DAC) steps during a bit error rate (BER) estimation scan (BES) and/or depth into read retry or read recovery tables. Alternatively, BER can be used from the garbage collection process and then ranked within a stripe on a per-location basis with the worst location being automatically chosen for parity information. Also, in addition to parity information, other metadata can be targeted for these locations, which would reduce the impact to the host if there was an error. If the location has a performance problem, the controller 102 can note the location for future storage of (XOR) parity information (act 1640), and the method ends (act 650). If the location does not have a performance problem, the method ends (act 650).

Figure 17:
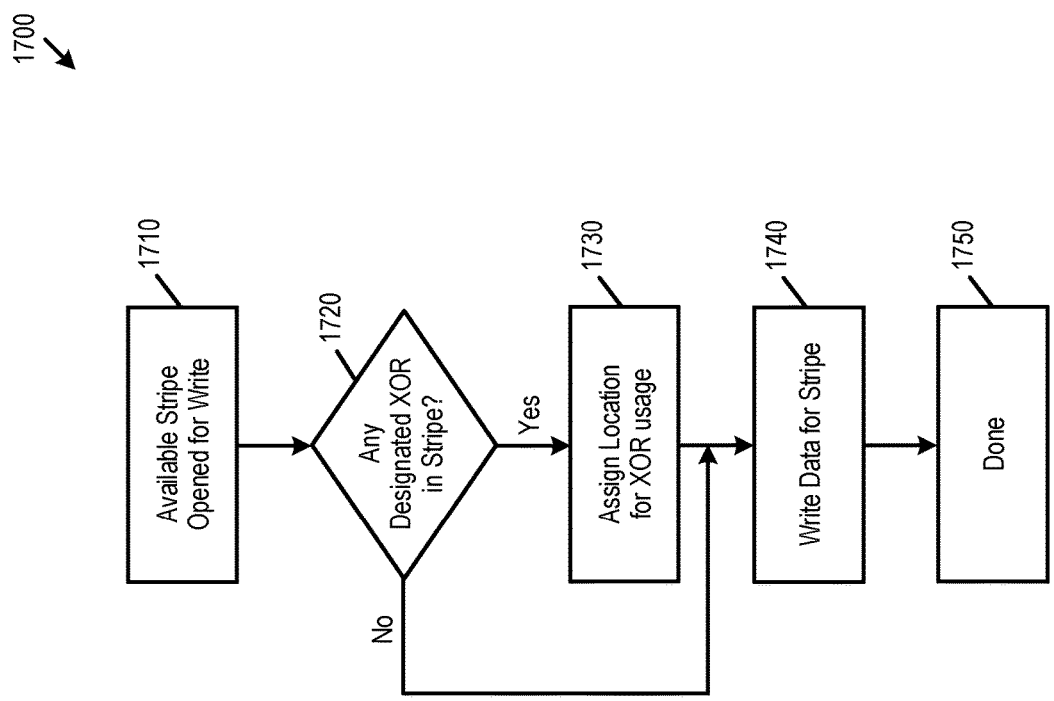
FIG. 17 is a flow chart of a write operation of an embodiment.

FIG. 17 is a flow chart 1700 of a write operation of an embodiment. As shown in FIG. 17, when the controller 102 identifies an available stripe opened for a write (act 1710), the controller 102 determines if there is a designated location in the stripe for parity information (act 1720). If there is, the controller 102 assigns the location for parity storage (act 1730), writes the data for the stripe (act 1740), and the method ends (act 1750). If a location is not designated, the controller 102 just writes the data for the stripe (act 1740) (e.g., in a customary location), and the method ends (act 1750).

There are several advantages associated with these embodiments. For example, these embodiments can be relatively simple to implement, as they may only require software/firmware changes and only act based on data that is short-lived. Also, BER data can be readily available to the controller 102 while performing garbage collection, so the controller 102 can pick what pieces were the worst and note them for parity information storage later. Further, in the case of a near-miss, the controller 102 can know the optimal location for parity location placement, without having to sort BER. This behavior can be engaged only when blocks are marginal and it is not in the critical path, so there is no performance impact. Additionally, these embodiments can provide a block-saving or reliability-enhancing behavior. If the drive does not remove marginal locations from use, there is a reliability risk under typical usage. But, as these embodiments can move the user data away from marginal locations, the reliability risk is minimized. Also, if the drive removes these locations from future use by the standard way of setting the block aside or partially setting the block aside, it does not have the location to use in the future, and it will run low on spare. As the block budget can be a major issue, these embodiments can help keep more marginal blocks in the pool while keeping the risk to user data low. As blocks get larger, retirements that are unnecessary become more painful. Also, as bits per cell trend higher, there will be a greater rate of false near-miss incidents. These embodiments can provide an easy way to avoid reliability issues in continued use of these locations and do not require retirement.

Figure 18:
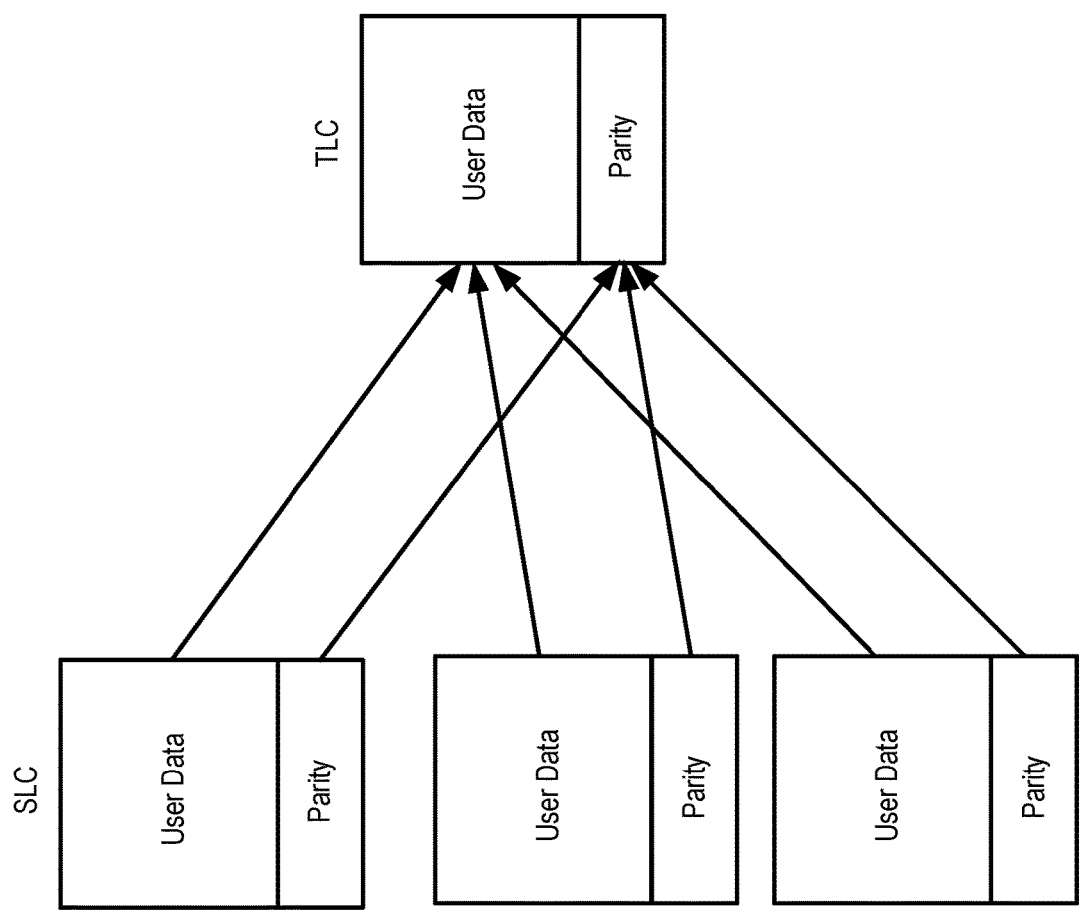
FIG. 18 is a diagram illustrating a folding operation of an embodiment.
Figure 19:
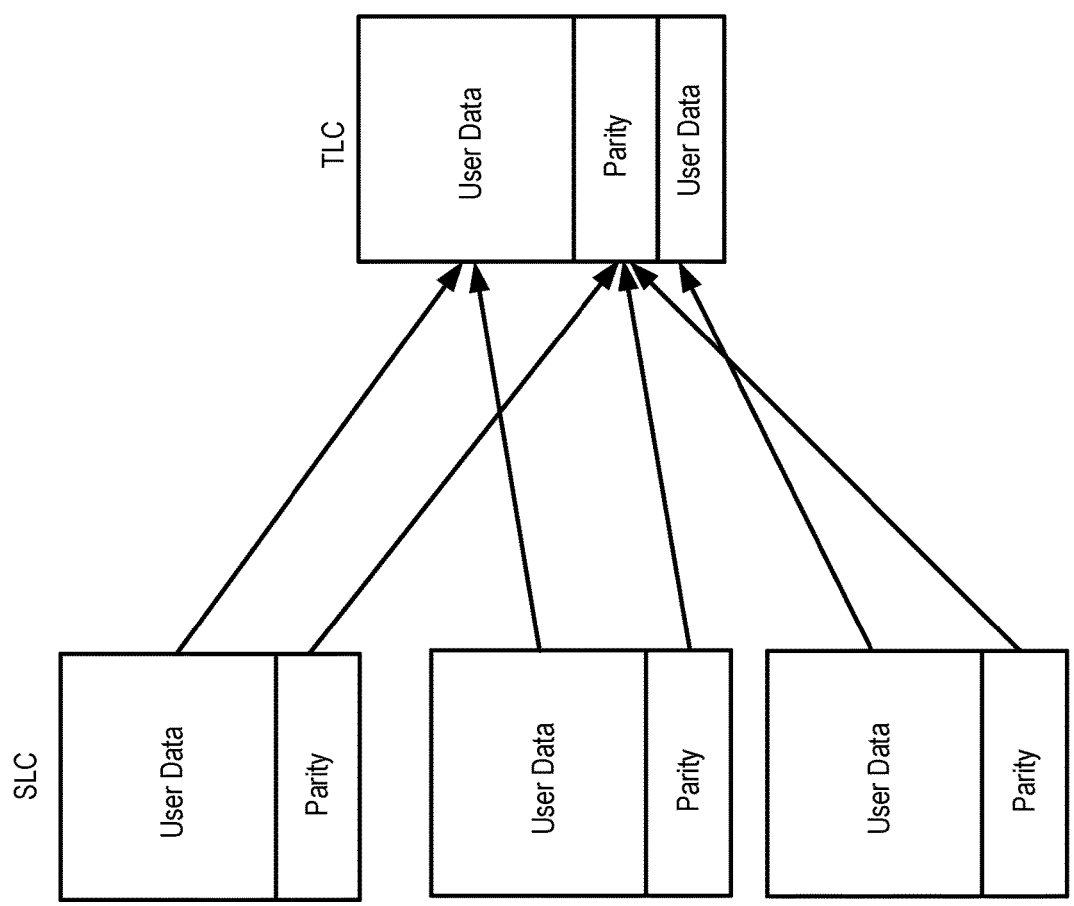
FIG. 19 is a diagram illustrating a folding operation of an embodiment.

Yet another example relates to vertical parity placement and will be discussed in conjunction with the folding operations shown in FIGS. 18 and 19. By way of background, not all wordlines are equally good, and some wordlines have a higher probability of failure, while others have a higher probability of requiring additional reads When read failures happen on user data, there is a performance impact to the host 300. These embodiments can solve this problem by placing XOR parities on wordlines that are most likely to fail or require read retries to recover the data, so that the impact to the host performance is minimized on wordlines that are more marginal. These embodiments can be used to place the parity in locations such that it will optimize host performance by minimizing read-retry attempts or minimize the likelihood of needing an XOR recovery, by keeping host data away from marginal wordlines as much as possible. Further, these embodiments can be used for journaling and checkpointing, as well as other metadata.

In one embodiment, the intelligent placement of vertical parity data is done during the SLC to TLC/QLC folding process, such that the host 300 is less likely to encounter errors that would impact performance. Examples of folding operations with and without use of these embodiments are shown in FIGS. 18 and 19. As shown in FIG. 19, with these embodiments, after the folding operation, the parity information is stored between the data.

There are several advantages associated with these embodiments. For example, there will likely always be some wordlines that are worse than others, and folding data to them that will not be read by the host 300 makes sense as it can be done at the cost of minimal firmware modifications. In SLC, the parity data is dependent on the user data, so it is placed after the user data is written due to programming order. However, in TLC, the parity data already exists, so there is no requirement that it follow the same ordering as was done in SLC. The same all holds true for metadata, such as check-pointing/journaling or event logging, but some of that data might impact time to array ready, so it can be best to limit it to data that was not impactful to array-ready time or on drives that may not see many power cycles, such as in an enterprise storage system (ESS).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a plurality of memory dies; and
    a processor coupled with the plurality of memory dies and configured to:
        store data and parity information for the data in locations in the plurality of memory dies;
        determine that at least one location in the plurality of memory dies has a lower performance than the locations storing the parity information; and
        move the parity information to the at least one location in the plurality of memory dies that has the lower performance.

2. The data storage device of claim 1, wherein the parity information is stored across all of the plurality of memory dies and moved to at least one of the memory dies that has the lower performance.

3. The data storage device of claim 2, wherein the at least one of the memory dies comprises a single memory die.

4. The data storage device of claim 2, wherein the at least one of the memory dies comprises a plurality of memory dies.

5. The data storage device of claim 1, wherein the parity information is stored in a single memory die and moved to at least one different memory die.

6. The data storage device of claim 5, wherein the parity information is moved to a single different memory die.

7. The data storage device of claim 5, wherein the parity information is moved to a plurality of different memory dies.

8. The data storage device of claim 1, wherein the parity information is stored across a plurality of wordlines of the plurality of memory dies and moved to at least one wordline of the plurality of memory dies that has the lower performance.

9. The data storage device of claim 8, wherein the parity information is moved during a folding operation.

10. The data storage device of claim 1, wherein the parity information is stored across single-level cells blocks in the plurality of memory dies and moved to multi-level cell blocks in the plurality of memory dies.

11. The data storage device of claim 1, wherein vertical placement of the parity information is changed after a folding operation, such that the parity information is stored between the data after the folding operation.

12. The data storage device of claim 1, wherein performance is measured by a number of read retries needed to read data.

13. The data storage device of claim 1, wherein performance is measured by a bit error rate.

14. The data storage device of claim 1, wherein performance is measured by a number of programming pulses or programming time needed to program data.

15. The data storage device of claim 1, wherein the plurality of memory dies comprises a redundant array of independent drives.

16. The data storage device of claim 1, wherein at least one of the plurality of memory dies comprises a three-dimensional memory array.

17. In a data storage device comprising a memory, a method comprising:
    reading data from a location in the memory;
    determining that the location has a performance below a threshold;
    designating the location for future storage of parity information; and
    storing parity information in the location.

18. The method of claim 17, wherein the parity information is part of an exclusive-or (XOR) stripe.

19. The method of claim 17, wherein the memory comprises a plurality of memory dies.

20. A data storage device comprising:
    a plurality of memory dies;
    means for storing data and parity information for the data in locations in the plurality of memory dies;
    means for determining that at least one location in the plurality of memory dies has a lower performance than the locations storing the parity information; and
    means for moving the parity information to the at least one location.

* * * * *